Figure 1:
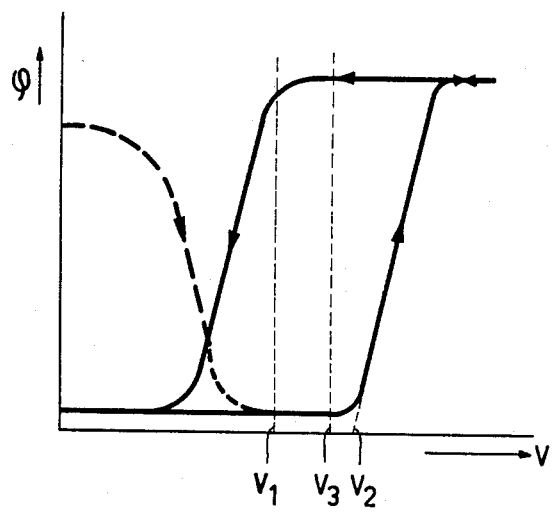
Figure 1:
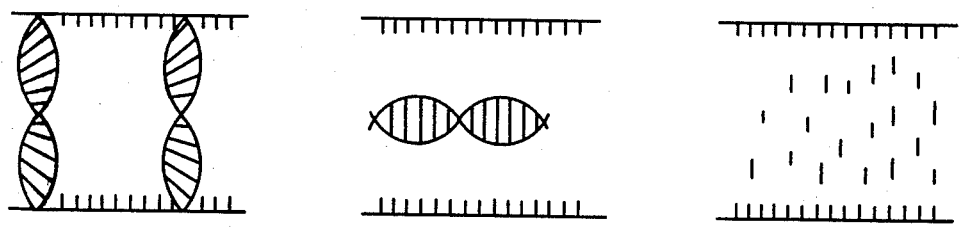

United States Patent [19]
de Zwart et al.

[11] 4,264,149
[45] Apr. 28, 1981

[54] LIQUID CRYSTAL DISPLAY DEVICE

[75] Inventors: Maarten de Zwart; Theodorus W. Lathouwers, both of Eindhoven, Netherlands

[73] Assignee: U.S. Philips Corporation, New York, N.Y.

[21] Appl. No.: 64,222

[22] Filed: Aug. 6, 1979

[30] Foreign Application Priority Data

Aug. 30, 1978 [NL] Netherlands ................ 7808899

[51] Int. Cl.³ ............................................. G02F 1/137
[52] U.S. Cl. ...................................... 350/346; 350/344; 350/336; 350/339 R
[58] Field of Search ........... 350/346, 336, 334, 339 R, 350/341

[56] References Cited

U.S. PATENT DOCUMENTS

| | | | |
|---|---|---|---|
| 3,787,110 | 1/1974 | Berreman et al. | 350/341 |
| 4,097,121 | 6/1978 | Tauer | 350/336 |
| 4,105,288 | 8/1978 | Geffcken et al. | 350/346 X |

OTHER PUBLICATIONS

Greubel: "Bistability Behavior of Texture in Cholesteric Liquid Crystals in an Electric Field," *Applied Physics Letters*, vol. 25, Jul. 1, 1974, pp. 5–7.

*Primary Examiner*—Edward S. Bauer
*Attorney, Agent, or Firm*—Thomas A. Briody; Robert T. Mayer; Paul R. Miller

[57] ABSTRACT

In a liquid crystal matrix display device in which the bistability effect of a cholesteric liquid crystal is used, the number of lines to be driven is increased by providing the electrodes (5) on grooves (3) provided in the supporting plates (1,2). The electrodes (5) partly overlap the part of a supporting plate present between two grooves. The electrode surface and the remaining surface of the supporting plates are covered by a dielectric layer (7). The grooves have a depth which is equal to half the desired thickness of the liquid crystal layer. Herewith a uniform thickness of the liquid crystal layer is also obtained.

2 Claims, 7 Drawing Figures

3a

3b

LIQUID CRYSTAL DISPLAY DEVICE

The invention relates to a display device comprising two supporting plates, crossing patterns of parallel strip-shaped electrodes on the facing surfaces of the supporting plates, a layer of cholesteric liquid crystal with positive dielectric anisotropy between the supporting plates, said liquid crystal, upon applying an electric field across the layer, having a focal-conic texture below a certain field strength $E_1$, having a homeotropicnematic texture above a certain field strength $E_2$, and having one of the said textures for a field strength between $E_1$ and $E_2$, the device furthermore comprising means to maintain the liquid crystal in the homeotropic-nematic texture at the edges of the electrodes above a field strength $E_2$ if the liquid crystal in the central part of the electrodes is in the homotropic-nematic texture at a field strength between $E_1$ and $E_2$. A cholesteric liquid crystal is to be understood to mean herein a nematic liquid crystal to which a quantity of cholesteric liquid crystal has been added and which mixture has a cholesteric texture.

Such a display device may serve to display alphanumeric or picture information.

A device of the kind stated in the opening paragraph is disclosed in British Patent Specification No. 1,506,331. In this known device a bistability effect known per se is used which some cholesteric liquid crystals show under the influence of an applied electric field. The device described in the said Patent Specification comprises two substantially parallel supporting plates. One or more electrodes are provided on the insides of the supporting plates. A cholesteric liquid crystal with a positive dielectric anisotropy is present between the supporting plates. The surfaces of the electrodes have been subjected to a surface treatment in known manner, with which a homeotropic orientation of the liquid crystal molecules at the electrode surfaces has been produced. The liquid crystal initially has a light-scattering focal-conic texture in which the axis of the helices are parallel to the electrode surfaces. Upon applying an electric field above a certain value $E_2$ across the liquid crystal layer, the helices are uncoiled and a transparent homeotropic-nematic texture is formed. When the electric field is reduced, the homeotropic-nematic texture returns to the light-scattering focal-conic texture only at a field strength $E_1 < E_2$. This focal-conic texture is maintained for a long period of time in the fieldfree state.

As a result of the said hysteresis, the liquid crystal layer, at a field strength between $E_1$ and $E_2$, may be either in the transparent homeotropic-nematic texture or in the light-scattering focal-conic texture, dependent on whether the field strength started from a higher or from a lower value.

This hysteresis is used particularly effectively in a so-called matrix-display device. In such a display device the electrodes are provided on the supporting plates in the form of parallel strips. The electrodes on one supporting plate cross the electrodes on the other supporting plate. The electrodes on one supporting plate constitute the so-called rows and the electrodes on the other supporting plate constitute the so-called columns of a matrix. The picture elements are situated at the crossings of the row and column electrodes.

In a matrix display device the rows are usually driven (so to say addressed) with a voltage which results in a field strength between $E_1$ and $E_2$ across the liquid crystal layer. The information is written on the columns, for example, with an equally large positive or negative control voltage. Dependent on the overall voltage (zero or twice the control voltage) across a picture element, a light-scattering focal-conic or a transparent homeotropic-nematic state occurs. In the time in which a row is not driven, a transparent homeotropic-nematic state of a picture element remains if the state upon driving was also transparent homeotropic-nematic. During the time in which said transparent state of a line element remains stable, other lines can be driven. However, the stability of said transparent homeotropic-nematic state is restricted in that the ambience of the picture element is in the focal-conic state. The focal-conic texture has the property of growing into the homeotropic-nematic state, which results in undesired light-scattering effects.

In order to prevent this effect, according to the said British Patent Specification, the edges of the electrode are covered with strip-shaped conductors which are in direct electric contact with the electrodes. If a field strength between $E_1$ and $E_2$ prevails between the actual electrodes and the liquid crystal layer has a transparent homeotropic-nematic texture, it is effected in this manner that a field strength exceeding $E_2$ prevails between the edges of the electrodes and in this manner a stable homeotropic-nematic state is present.

However, for a good operation of the above-mentioned method it is required for the electrodes to be everywhere exactly at the correct distance from each other since otherwise contrast differences occur and the duration of stability of the homeotropic-nematic state is adversely influenced. In addition, such an electrode configuration causes undesired peaks in the field strength in the corners of each element.

It is the object of the invention to provide a display device which uses a bistability effect of a cholesteric liquid crystal, in which the edges of the electrodes cause no disturbing effects and in which the layer thickness of the liquid crystal has a great uniformity throughout the device.

A device of the kind described in the opening paragraph is characterized according to the invention in that the same means are formed by grooves which are provided in the supporting plates and are separated by ridges and have a depth equal to half the desired thickness of the liquid crystal layer, by electrodes provided in the grooves and extending up to the ridges and being separated from each other by a narrow strip on the ridges, and by a layer of dielectric material covering the electrode surface and the surface of the supporting plates situated between the electrodes.

With a display device according to the invention the edges of a picture element are subjected to a field strength which is twice as high as that of the actual electrode surface. As a result of this, the growth of the focal-conic texture into the homeotropic-nematic texture is prevented. Since the depth of the grooves is half the desired layer thickness of the liquid crystal, a good uniform distance between the supporting plates is also obtained.

Although it is known from German Offenlegungsschrift No. 2,163,043 to provide electrodes in grooves which are etched in glass supporting plates and the distance of which between the electrodes is determined by the etching depth, such an electrode configuration is not suitable to prevent the growth of the focal-conic texture into the homeotropic-nematic texture.

Figure 2:
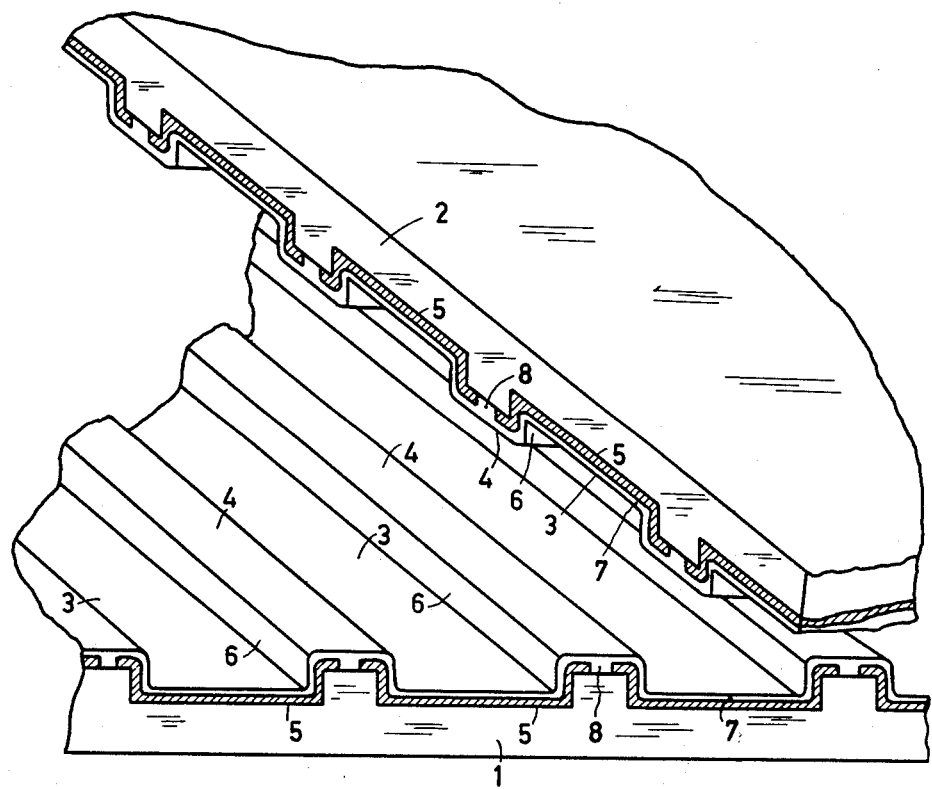
Figure 3:
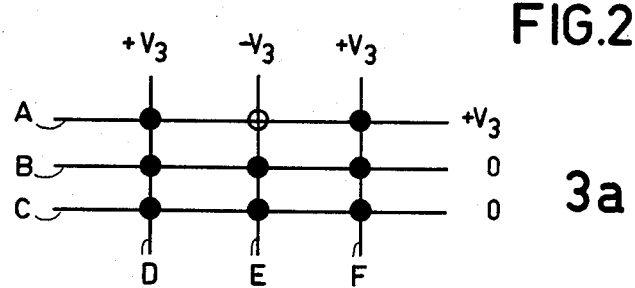
Figure 3:
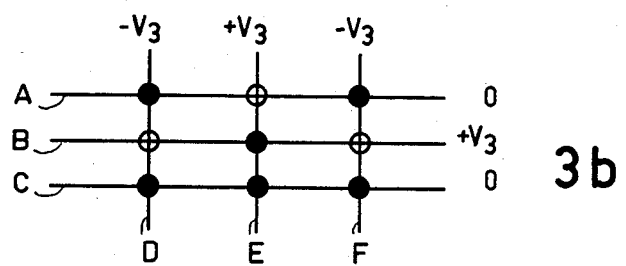

The invention will now be described in greater detail with reference to the accompanying drawings, of which:

FIGS. 1 a–d illustrates the operating principle of a display device embodying the invention, FIG. 2 shows a display device embodying the invention, and FIGS. 3 a–b illustrates the driving of a matrix display device.

FIG. 1a shows a voltage-transmission characteristic of a display device which uses the bistability effect of a cholesteric liquid crystal with positive dielectric anisotropy. The longitudinal axes of the liquid crystal molecules are oriented perpendicularly to the electrode surface at the interface with the electrodes. For this purpose the electrode surface has been subjected in known manner to a surface treatment. The liquid crystal starts from a transparent planar-conic texture, as is shown diagrammatically in FIG. 1b. The pitch of the helices depends on the composition of the nematic-cholesteric liquid crystal mixture and on the cholesteric liquid crystal used. Upon applying a voltage across the electrodes, the transparent planar-conic texture, at a certain voltage dependent on the layer thickness and on the liquid crystal used, changes into a light-dispersing focal-conic texture which is shown in FIG. 1c. The axes of the helices rotate in a direction parallel to the plates. When the voltage is increased above a given value $V_2$, the helices are uncoiled and a transparent homeotropic-nematic texture as shown in FIG. 1d is formed. When the voltage is decreased, the transparent homeotropic-nematic texture is maintained till a voltage $V_1 < V_2$, below which voltage the light-dispersing focal-conic texture is formed again. The focal-conic texture is maintained when the voltage across the electrodes is decreased. In the field-free state the focal-conic texture slowly changes to the planar-conic texture. However, the times required for this purpose are large as compared with the switching times usual in a matrix driving, so that the planar-conic testure does not occur in an operating matric display device. At a voltage $V_1 < V_3 < V_2$ the liquid crystal layer is in a transparent homeotropic-nematic state if the voltage started from a value exceeding $V_2$ or in a light-dispersing focal-conic state if the voltage started from a value lower than $V_1$.

FIG. 2 shows a display device embodying the invention partly broken away. The display device comprises two glass supporting plates 1 and 2. The facing surfaces of the supporting plates 1 and 2 have parallel grooves 3. The grooves in the supporting plate 1 are oriented perpendicularly with respect to the grooves in the supporting plate 2. The depth of the grooves 3 is 6 μm and the mutual pitch of the grooves is 1.25 mm. The grooves 3 are separated from each other by a ridge 4 having a width of 300 μm.

The grooves 3 are provided by first covering a flat glass plate with a nickel-phosphorus layer and providing therein a mask for the grooves in known manner by means of a photolacquer. The grooves are then etched with a solution of ammonium fluoride and hydrogen fluoride. The depth of the grooves is controlled by the duration of etching and the concentration of the etching liquid. By this way of etching, grooves are obtained the depth of which is well-homogeneous throughout the glass plate. Grooves having a depth of approximately 4–15 μm can be obtained by etching.

The grooves 3 in the glass plates 1 and 2 are covered by electrodes 5. The electrodes 5 also cover the upright edges 6 and partly the ridges 4 of the grooves 3. The electrodes 5 are separated from each other by a 100 μm wide strip 8 on the ridge 4. The electrodes 5 are provided by first covering entirely the grooved glass plates 1 and 2 with an approximately 0.1 μm thick layer of indium oxide. After providing a mask, the electrode pattern is etched by means of a solution of ferrichloride and hydrochloric acid ($FeCl_3 + HCl$). The electrodes 5 on the glass plate 1 in this manner form, for example, the rows and the electrodes 5 on the glass plate 2 form the columns of a matrix of picture elements. A dielectric layer 7 of $SiO_2$ is provided in a thickness of 0.5 μm by sputtering over the whole surface of the glass plates 1 and 2.

The dielectric layers 7 contact each other at the four corners of each picture element. As a result of this it is not necessary to provide spacing members for keeping the supporting plates 1 and 2 at the correct distance. The distance between the edges of the electrodes 5 of a picture element is equal to the depth of etching the grooves 3, which grooves have a depth of 6 μm increased by twice the thickness of the dielectric layer 7. In the central part of each picture element the electrodes 5 are at a distance of 12 μm from each other. In this manner a good uniform layer thickness is obtained of the liquid crystal which is present between the supporting plates 1 and 2. The liquid crystal is of the cholesteric type with a positive dielectric anisotropy and is composed, for example, for 94% of a nematic liquid crystal mixture containing 47% of 4-cyano-4'-n-pentylbiphenyl, 25% of 4-cyano-4'-n-heptylbiphenyl, 18% of 4-cyano-4'-cyano-4'-n-octoxybiphenyl and 10% of 4-cyano-4'-n-pentylterphenyl, which mixture is commercially available as E7 from BDH-Chemicals, and is composed for 6% of the cholesteric liquid crystal 4-cyano-4'-(2-methylbutyl)-biphenyl, which material is commercially available as CB 15 also from BDH-Chemicals. Liquid crystals of the cholesteric type can generally be used which have a positive dielectric anisotropy and of which the pitch for the usual layer thicknesses is at most equal to one third of the layer thickness. In order to obtain a homeotropic orientation of the liquid crystal at the interface of the supporting plates the dielectric layer 7 is treated with, for example, a solution of perfluorosilane in hexane.

With the given layer thickness of 12 μm of the liquid crystal layer, the transition occurs from the light-dispersing focal-conic state to the transparent homeotropic-nematic state at a voltage of approximately 11 Volts, while the reverse transition occurs at a voltage of approximately 6 Volts. The latter voltage is slightly dependent on the extent to which a good homeotropic orientation of the liquid crystal molecules have been effected at the interfaces with the supporting plates.

The control of a matrix display device embodying the invention will be explained with reference to FIG. 3. A, B and C denote a number of row electrodes and D, E and F denote a number of column electrodes. The row electrodes are sucessively driven with a voltage $V_3$ of approximately 9 Volts (see FIG. 1a). The information on the column electrodes is written with a positive or negative voltage also equal to $V_3$. FIG. 3a shows the situation in which row electrode A is driven. The picture elements across which there is an overall voltage equal to 2 $V_3$ are in the homeotropic-nematic state and are light transmitting. In FIG. 3a this is the case for the element at the crossing of row electrode A and column electrode E denoted by a circle. The voltage at the remaining picture elements of row A is 0 Volts. These elements, denoted in FIG. 3a by a black dot, are in the light-dispersing focal-conic texture. It is to be noted that it is not necessary to drive the column electrodes with a voltage which is equal to $V_3$. The control voltage at the column electrodes must have such a value that the sum of this voltage and the voltage $V_3$ brings the picture element in the stable homeotropic-nematic state and the difference between this voltage and the voltage $V_3$ brings the picture element in the stable focal-conic state. When the next row electrode B is driven, the transparent element on the row electrode A remains in the bistable transparent nematic state. The original light-dispersing elements remain in the bistable light-dispersing state. The situation after driving line electrode B is shown in FIG. 3b. In the time in which row electrode A is not driven and the picture element at the crossing of row electrode A and column electrode E is in the transparent state at a voltage $V_3$, a number of successive lines can be driven. The number of lines to be driven is determined by the time in which the bistable state is maintained. According to the invention the edges of the electrodes are situated at a distance from each other which is twice as small as the remaining electrode surface. Twice as large a field strength then is across the edges of the picture elements at the crossing of row electrode A and column electrode E. The edges of the picture element thus are in a stable transparent homeotropic-nematic state. Herewith it is prevented that the focal-conic structure with which the picture element is surrounded, grows into the bistable nematic structure and hence causes light-dispersing interferences. Since the areas on the ridges between the grooves situated between the electrodes are also situated at a distance equal to half the thickness of the liquid crystal layer, another advantage occurs. In fact it has been found that in the field-free state with very thin layers the transparent planar-conic texture is more stable than the light-dispersing focal-conic texture. As a result of this, no disturbing light-dispersing grating occurs of areas situated between the picture elements. As a result of the electrode configuration according to the invention the stability of the transparent state of a picture element at a voltage $V_3$ is increased. The permits of increasing the number of lines to be driven on a matrix display device.

In addition to the above-described driving method it is alternatively possible to bring all the picture elements of the matrix in a transparent state by means of a voltage pulse at a voltage $V_3$, and to drive the row electrodes successively from this situation.

What is claimed is:

1. A display device comprising two supporting plates, crossing patterns of parallel strip-shaped electrodes on the facing surfaces of the supporting plates, a layer of cholesteric liquid crystal with positive dielectric anisotropy between the supporting plates, said liquid crystal, upon applying an electric field across the layer, having a focal-conic texture below a certain field strength $E_1$, having a homeotropic-nematic texture above a certain field strength $E_2$, and having one of the said textures for a field strength between $E_1$ and $E_2$, the device furthermore comprising means to maintain the liquid crystal in the homeotropic-nematic texture at the edges of the electrodes above a field strength $E_2$ if the liquid crystal in the central part of the electrodes is in the homeotropic-nematic texture at a field strength between $E_1$ and $E_2$ characterized in that the said means are formed by grooves which are provided in the supporting plates and are separated by ridges and have a depth substantially equal to half the desired thickness of the liquid crystal layer, by electrodes provided in the grooves and extending up to the ridges and being separated from each other by a narrow strip on the ridges, and by a layer of dielectric material covering the electrode surface and the surface of the supporting plates situated between the electrodes.

2. A display device as claimed in claim 1, characterized in that the supporting plates are of glass and the said grooves have been obtained by etching the glass.

* * * * *